United States Patent
Han et al.

(10) Patent No.: US 11,330,026 B1
(45) Date of Patent: May 10, 2022

(54) CONCURRENT SCREEN SHARING BY MULTIPLE USERS WITHIN A COMMUNICATION SESSION

(71) Applicant: Zoom Video Communications, Inc., San Jose, CA (US)

(72) Inventors: Lin Han, Los Altos, CA (US); Bo Ling, Saratoga, CA (US); Hailei Sheng, San Jose, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/390,922

(22) Filed: Jul. 31, 2021

(51) Int. Cl.
*G06F 3/033* (2013.01)
*G06F 3/0481* (2013.01)
*H04L 65/403* (2022.01)
*G06F 3/14* (2006.01)

(52) U.S. Cl.
CPC .......... *H04L 65/403* (2013.01); *G06F 3/1454* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 4,974,173 A | * | 11/1990 | Stefik | G06F 9/451 715/751 |
| 5,107,443 A | * | 4/1992 | Smith | G06Q 10/10 713/166 |
| 5,796,396 A | * | 8/1998 | Rich | G06F 3/038 715/741 |
| 8,091,029 B1 | * | 1/2012 | Gay | G06F 9/451 715/734 |
| 9,077,776 B1 | * | 7/2015 | Salesky | G06F 3/04842 |
| 9,189,143 B2 | * | 11/2015 | Jones | G06F 3/0488 |
| 9,282,167 B2 | * | 3/2016 | Jo | G06F 3/1454 |
| 10,139,917 B1 | * | 11/2018 | Nariyawala | H04N 7/15 |
| 10,397,520 B2 | * | 8/2019 | Nelson | H04M 7/0027 |
| 10,403,050 B1 | * | 9/2019 | Beall | G06F 3/04817 |
| 10,645,137 B2 | * | 5/2020 | Pell | H04N 7/15 |
| 10,768,803 B2 | * | 9/2020 | Van Der Zaag | G06F 9/451 |
| 10,931,676 B2 | * | 2/2021 | Pantazelos | G06F 21/6263 |

(Continued)

*Primary Examiner* — Jordany Nunez
(74) *Attorney, Agent, or Firm* — Cognition IP, P.C.; Edward Steakley

(57) ABSTRACT

Methods and systems relate to a method for providing concurrent sharing of screen elements by multiple users within a communication session. First, a system connects multiple participants of a communication session. The system receives, from a first participant, a request to initiate sharing of one or more screen elements from a user device associated with the first participant. In response to the request, the system captures and displays the one or more screen elements from the user device of the first participant to the communication interfaces of the other participants. The system then receives, from one or more additional participants of the communication session, additional requests to initiate sharing of one or more additional screen elements. In response, the system captures and displays the additional screen elements of the additional participants to the communication interfaces of the other participants, such that multiple screen elements from multiple users are displayed concurrently.

16 Claims, 13 Drawing Sheets

(56) References Cited

U.S. PATENT DOCUMENTS

| | | | | |
|---|---|---|---|---|
| 11,132,643 B1* | 9/2021 | Casale | .................. | G06F 3/0481 |
| 2008/0048975 A1* | 2/2008 | Leibow | .................. | G06F 3/1454 |
| | | | | 345/156 |
| 2009/0094532 A1* | 4/2009 | Lyle | ..................... | G06Q 10/109 |
| | | | | 715/753 |
| 2009/0213205 A1* | 8/2009 | Ivashin | ................. | H04L 67/125 |
| | | | | 348/14.08 |
| 2011/0271211 A1* | 11/2011 | Jones | ................... | H04M 3/567 |
| | | | | 715/753 |
| 2012/0084672 A1* | 4/2012 | Vonog | ................ | H04L 12/1827 |
| | | | | 715/756 |
| 2012/0203844 A1* | 8/2012 | Wang | ................... | H04L 12/189 |
| | | | | 709/206 |
| 2012/0274728 A1* | 11/2012 | Yasoshima | ......... | H04L 67/1074 |
| | | | | 348/14.07 |
| 2012/0319927 A1* | 12/2012 | Khatib | ................. | G06F 3/1446 |
| | | | | 345/2.1 |
| 2014/0129948 A1* | 5/2014 | Jones | ..................... | G06F 3/048 |
| | | | | 715/733 |
| 2014/0240445 A1* | 8/2014 | Jaynes | ................ | H04N 21/431 |
| | | | | 348/14.07 |
| 2016/0231888 A1* | 8/2016 | Govindraj | ............ | G06F 3/0485 |
| 2016/0378417 A1* | 12/2016 | Kenjalkar | ........... | H04L 65/1089 |
| | | | | 345/2.2 |
| 2017/0302887 A1* | 10/2017 | Nelson | ................. | H04L 65/403 |
| 2018/0254067 A1* | 9/2018 | Elder | .................... | G06F 3/0488 |
| 2020/0333994 A1* | 10/2020 | Sepulveda | ............ | G06F 3/0416 |
| 2021/0120053 A1* | 4/2021 | Shin | .................... | H04L 67/1068 |
| 2021/0365231 A1* | 11/2021 | Bjork | ................... | G06F 3/0481 |

* cited by examiner

Advanced Sharing Options

How many participants can share at the same time?

◉ One participant can share at a time

○ Multiple participants can share simultaneously (dual monitors recommended)

Who can share?

○ Only host          ◉ All participants

Who can start sharing when someone else is sharing?

◉ Only host          ○ All participants

Figure 3B

CONCURRENT SCREEN SHARING BY MULTIPLE USERS WITHIN A COMMUNICATION SESSION

FIELD OF INVENTION

The present invention relates generally to digital communication, and more particularly, to systems and methods providing concurrent sharing of screen elements by multiple users within a communication session.

BACKGROUND

Digital communication tools and platforms have been essential in providing the ability for people and organizations to communicate and collaborate remotely, e.g., over the internet. In particular, there has been massive adopted use of communication platforms allowing for remote video sessions between multiple participants. Communications applications for casual friendly conversation ("chat"), webinars, large group meetings, work meetings or gatherings, asynchronous work or personal conversation, and more have exploded in popularity.

One common use case for such communication platforms is to enable remote teams (of, e.g., employees or students) to work together and collaborate. This is often enabled by the ability within a communication session for a participant to "screen share". Screen sharing, as discussed herein, relates to a participant's ability to share their screen or elements of their screen, that is, share what they are currently working on at their particular device. For example, a participant of a communication session may be able to share their entire screen, including all windows or other elements that are open on their screen at the moment, or a participant may instead opt to share a single window or element within that screen. Other participants of the communication session will be able to see what is being shared by the participant on their own screen, such as within a window or browser tab dedicated to the communication platform.

While such screen or screen element sharing is highly useful and conducive to collaboration between participants, it has so far been the case on communication platforms that only one participant may share their screen or a screen element at a time. Thus, remote teams working together may be unable to see each other's screens simultaneously. In most cases, the participant sharing their screen will have to choose to stop sharing first before a second participant is able to share their screen or screen element, since only one single participant can share their screen at any given time.

Thus, there is a need in the field of digital communication to create a new and useful system and method for providing concurrent sharing of screen elements by multiple users within a communication session. The source of the problem, as discovered by the inventors, is a lack of ability for potentially multiple users to simultaneously share their screens or screen elements in order to collaborate during a live video session.

SUMMARY

The invention overcomes the existing problems by allowing concurrent sharing of screens or screen elements (hereinafter, "screens or screen elements" will be simplified as "screen elements") within a communication session of a communication platform.

In one embodiment, a system connects multiple participants of a communication session with the ability to share screen elements simultaneously. The system then receives, from a first participant of the communication session, a request to initiate sharing of one or more screen elements from a user device associated with the first participant. In response to the request, the system captures and displays the one or more screen elements from the user device of the first participant to the communication interfaces of the other participants. The system then receives, from one or more additional participants of the communication session, additional requests to initiate sharing of one or more additional screen elements from the user devices associated with the additional participants. Finally, in response to the additional requests, the system captures and displays the one or more additional screen elements from the user devices of the additional participants to the communication interfaces of the other participants, such that multiple screen elements from multiple users are displayed concurrently.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein:

FIG. 3B is a diagram illustrating a communications interface with screen sharing settings, in accordance with some embodiments.

DETAILED DESCRIPTION

Figure 1A:
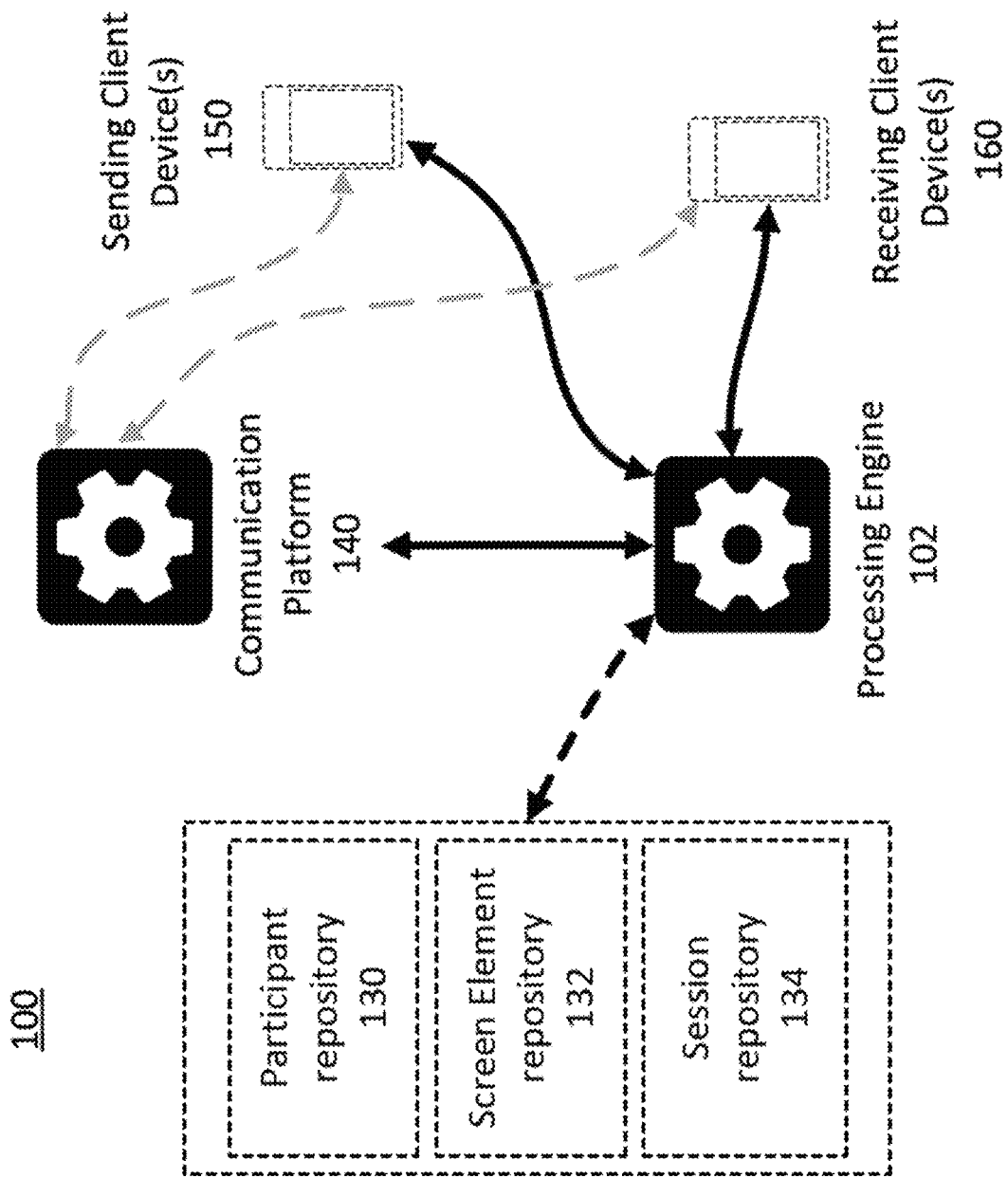
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, a team within an organization may wish to work together remotely, but are not able to see each other's screens simultaneously. Instead, only one screen at a time may be shared within a session of the communication platform being used. For example, in order for Anna to share a screen or screen elements after Michael has already started sharing, Michael must first stop sharing his screen. Once no screen is being shared, Anna can then share her screen.

In contrast, using the current approach, multiple participants can share their screen(s) or screen element(s) simultaneously at any given point in time during a communication session. Thus, Anna and Michael can both share their screens at the same time. Each can share multiple screens or screen elements, and each can view multiple shared screens or screen elements on their monitor or monitors. Each of them can individually choose which screen they would like to see on a monitor, view the screens side-by-side on a single monitor, or view different screens on two or potentially more monitors. In addition, an arbitrary number of screens can be shared within a communication session, and users can have control over which screen(s) they are viewing, and how the screens are presented (e.g., resizable window, full screen, and any other suitable form, size, position, or arrangement). No participant is required to stop sharing before others can share. This provides flexibility and increased collaboration across multiple screens and environments for the team, allowing them to work remotely more effectively.

Many other possibilities and options can be contemplated for this use case and others, as will be described in further detail throughout.

I. Exemplary Environments

FIG. 1A is a diagram illustrating an exemplary environment in which some embodiments may operate. In the exemplary environment 100, one or more sending client device(s) 150 and one or more receiving client device(s) 160 are connected to a processing engine 102 and, optionally, a communication platform 140. The processing engine 102 is connected to the communication platform 140, and optionally connected to one or more repositories and/or databases, including a participant repository 130, screen element repository 132, and/or a session repository 134. One or more of the databases may be combined or split into multiple databases. The sending client device(s) 150 and receiving client device(s) 160 in this environment may be computers, and the communication platform server 140 and processing engine 102 may be applications or software hosted on a computer or multiple computers which are communicatively coupled via remote server or locally.

The exemplary environment 100 is illustrated with only one sending client device, one receiving client device, one processing engine, and one communication platform, though in practice there may be more or fewer sending client devices, receiving client devices, processing engines, and/or communication platforms. In some embodiments, one or more of the sending client device(s) and receiving client device(s) may be the same or part of the same computer(s) or device(s). In some embodiments, one or more processing engines and/or communication platforms may additionally be the same or part of the same computer(s) or device(s).

In an embodiment, the processing engine 102 may perform the method 200 (FIG. 2A) or other method herein and, as a result, provide concurrent sharing of screen elements from multiple users within a communication session. In some embodiments, this may be accomplished via communication with the sending client device and receiving client device, additional sending or receiving client device(s), processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The sending client device 150 and receiving client device(s) 160 are devices with a display configured to present information to a user of the device. In some embodiments, the sending client device(s) 150 and receiving client device(s) 160 present information in the form of a user interface (UI) with UI elements or components. In some embodiments, the sending client device(s) 150 and receiving client device(s) 160 send and receive signals and/or information to the processing engine 102 and/or communication platform 140. The sending client device 150 is configured to perform functions related to presenting and playing back a screen, screen element(s), video, audio, documents, annotations, and other materials within a video presentation (e.g., a virtual class, lecture, webinar, or any other suitable video presentation) on a communication platform. The receiving client device(s) 160 are configured to receiving display of and displaying the screen, screen element(s), video presentation, and in some cases, presenting material and/or video as well. In some embodiments, the sending client device(s) 150 and/or receiving client device(s) 160 can include an embedded or connected camera which is capable of generating and transmitting video content in real time or substantially real time. For example, one or more of the client devices may be smartphones with built-in cameras, and the smartphone operating software or applications may provide the ability to display live streams based on the video generated by the built-in cameras. In some embodiments, the sending client device(s) 150 and receiving client device(s) 160 are computing devices capable of hosting and executing one or more applications or other programs capable of sending and/or receiving information. In some embodiments, the sending client device(s) 150 and/or receiving client device(s) 160 may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the sending client device(s) 150 and/or receiving client device(s) 160. In some embodiments, one or more of the communication platform 140, processing engine 102, and sending client device(s) 150 or receiving client device(s) 160 may be the same device. In some embodiments, the sending client device(s) 150 is associated with a first user account on the communication platform, and the receiving client device(s) 160 are associated with additional user account(s) on the communication platform.

In some embodiments, optional repositories can include one or more of a participant repository 130, screen element repository 132, and/or session repository 134. The optional repositories function to store and/or maintain, respectively, user account information associated with the communication platform 140, video content received by the communication platform 140 for display within video presentations, and annotations, which may include media and/or messaging-based annotations. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate presentations (e.g., video presentations) and/or communication between two or more parties, such as within, e.g., a video conference or virtual classroom.

Figure 1B:
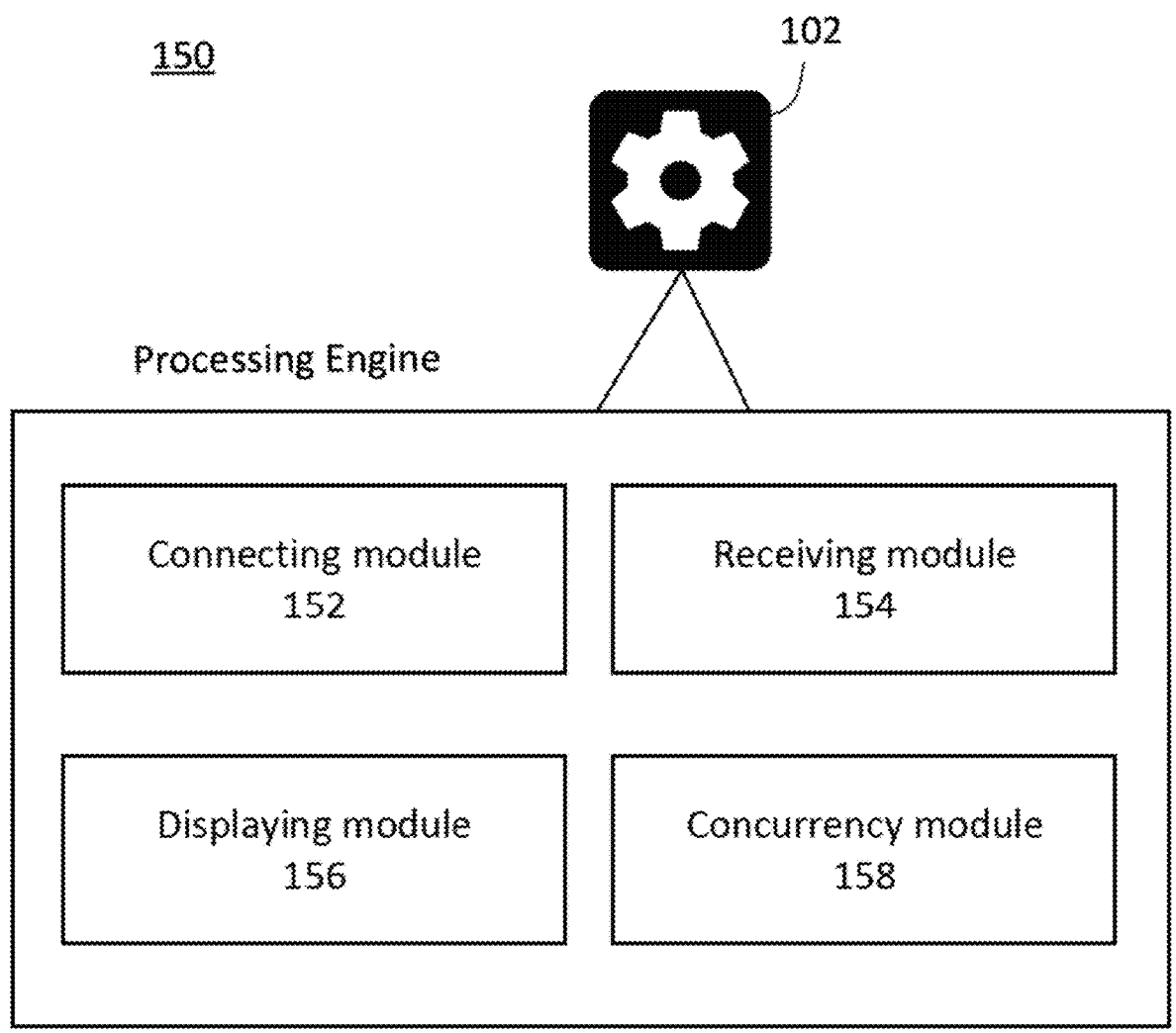
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Connecting module 152 functions to connect a number of participants of a communication session to a live communication stream, including a communication interface for each participant, Receiving module 154 functions to receive from a first participant of the communication session and/or additional participants, a request to initiate sharing of one or more screen elements from a user device associated with each participant.

Displaying module 156 functions to capture and display the one or more screen elements from the user device of the first participant and/or additional participants to the communication interfaces of the participants.

Concurrency module 158 functions to provide screen elements from multiple users to be shared to the communication interfaces of the participants of the communication session, such that the screen elements are displayed concurrently to the participants.

The above modules and their functions will be described in further detail in relation to an exemplary method below.

II. Exemplary Method

Figure 2:
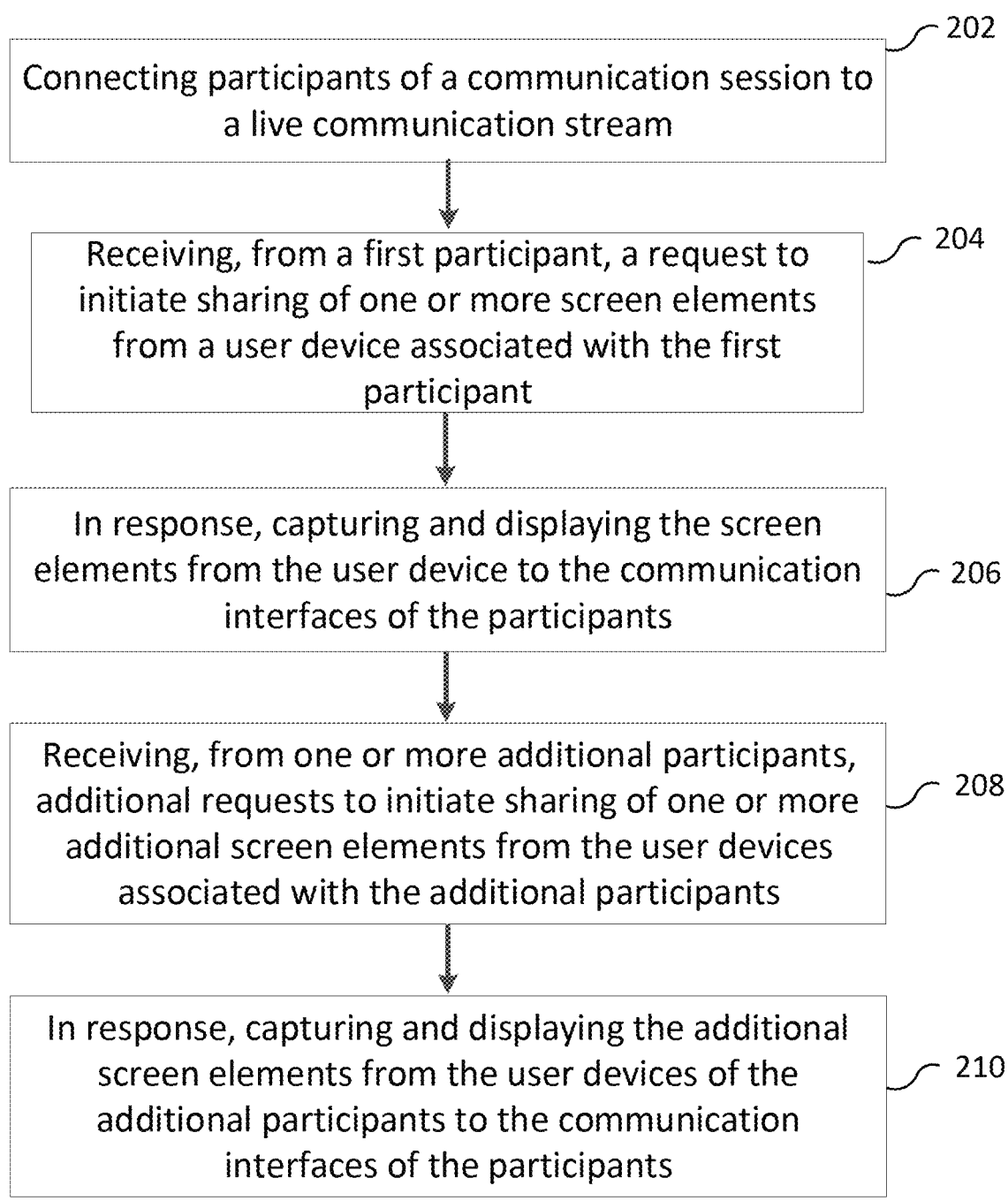
FIG. 2 is a flow chart illustrating an exemplary method 200 that may be performed in some embodiments.

FIG. 2A is a flow chart illustrating an exemplary method that may be performed in some embodiments.

At step 202, the system connects participants of a communication session to a live communication stream. The communication session may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

In some embodiments, the communication session includes a communication interface for each participant. The communication interface is a user interface ("UP") displayed on the client device that each participant is using. In some embodiments, the communication interface appears different for different participants, or has different UI elements included for different participants depending on their user permissions, access levels (e.g., a premium-tier business user account as compared to a free-tier user account), or other aspects that may differentiate one participant from another within the communication platform. In various embodiments, the communication interface is configured to allow the participant to, e.g., navigate within the communication session, engage or interact with one or more functional elements within the communication session, control one or more aspects of the communication session, and/or configure one or more settings or preferences within the communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

At step 204, the system receives, from a first participant, a request to initiate sharing of one or more screen elements from a user device associated with the first participant. In some embodiments, the request can be received by the participant navigating within the communication interface provided for display on the client device the participant is using.

A screen element represents any element, subset, or superset of a screen or UI that may be displayed on a client device. A screen element may be, e.g., a "window" within a desktop UI containing multiple windows, each representing a container for an application or element of an application. A screen element may be a full screen displayed on a user device. A screen element may also be, e.g., a "tab" among multiple tabs within a browser, with each tab displaying a single page the user has navigated to. Many other such screen elements may be contemplated.

Figure 3A:
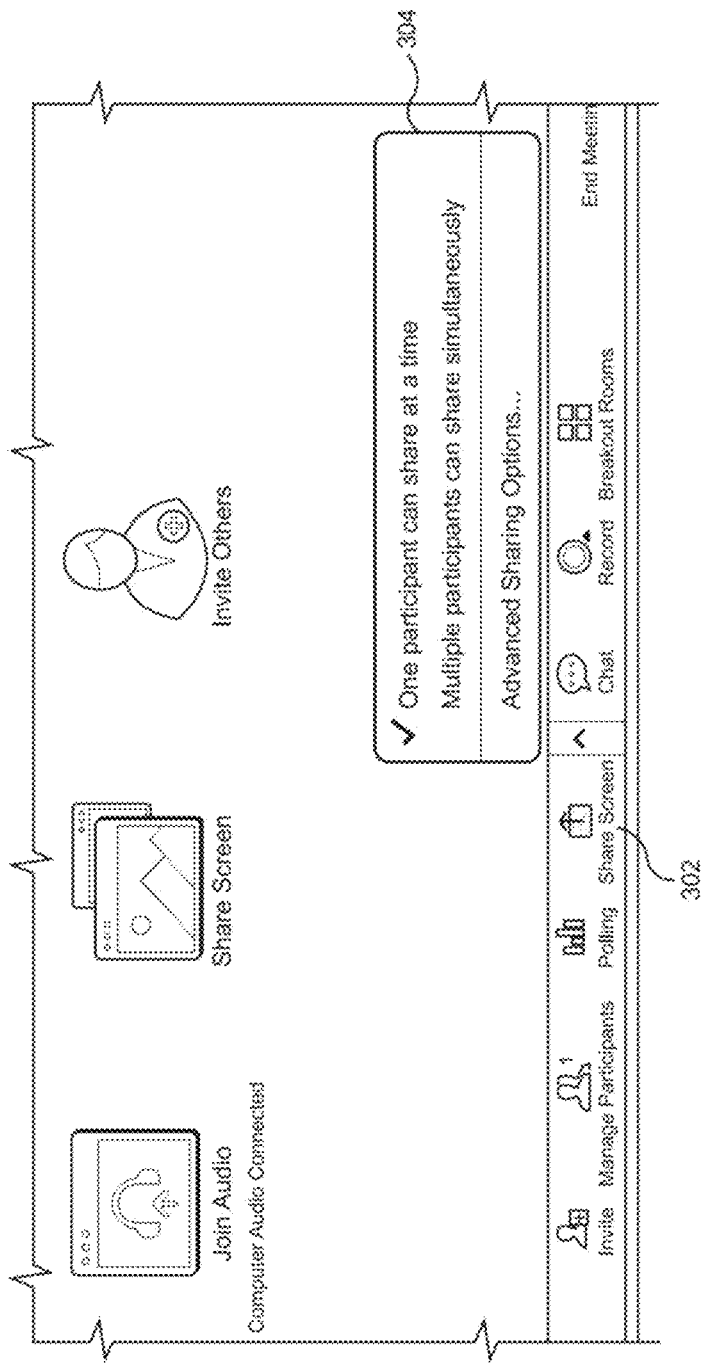
FIG. 3A is a diagram illustrating a communications interface with screen sharing elements, in accordance with some embodiments.

In one example, the communication interface for a participant may include a UI element labeled "Share Screen" for the user to share his screen(s) and/or one or more screen elements. One example of a communication interface with an interface element for the user sharing screen(s) or screen element(s) is illustrated in FIG. 3A, which will be described in further detail below. Upon engaging with the UI element (e.g., clicking on the element), the UI may allow the user to select between various screen elements. In some embodiments, one or more of the screen elements may represent a full screen, such as a desktop UI of a computer device. In some embodiments, multiple such screens may be selected between, for example, when a participant is using a multiple monitor setup with a different desktop configured to be displayed on each monitor. In some embodiments, the user can select multiple screen elements to be shared. For example, a user with four window elements open on a desktop may opt to share two of the window elements simultaneously. In another example, a user with two desktop UIs (or "screens") displayed across two monitors may opt to share both of the screens.

In some embodiments, a screen element may include or consist of any media or documents which can be accessed in a communications platform, such as e.g., video, audio, text, presentation documents consisting of a number of slides, or a game or other interactive interface or component. In some embodiments, a screen element may be, e.g., a collaborative or editable document, or shared presentation. In some embodiments, a user may download or otherwise retrieve a screen element from an external source, then import it into the communications platform. In some embodiments, a presentation including a number of slides may be selected as a screen element. The presentation can depict one slide at a time in a slideshow format, with the user clicking or performing some other action to progress to the next slide. In some embodiments, the screen element may be a video, such as a short movie which can be played back such that the video plays at the same time for all users participating in the video session. In some embodiments, the screen element may be, e.g., a word processor document or spreadsheet document, a web site, a PDF document, or any other suitable viewable material. In some embodiments, the screen element is dynamically generated in real time during the video session.

In some embodiments, screen elements may include audio playback. Such audio playback may include playback of audio elements which can be heard by the participant sharing the screen during normal operation of the screen, device, window, or other elements. In some embodiments, when multiple screen elements are shared simultaneously by multiple users, such screen elements can include playback of audio elements from multiple users simultaneously. In some embodiments, a user may be able to configure their experience by, e.g., selecting one or more audio elements to be heard exclusively and/or muting one or more audio elements while playing other audio elements.

At step 206, in response to receiving the request to initiate sharing, the system captures and displays the screen element(s) from the user device to the communication interfaces of the participants. In some embodiments, the system captures the screen element(s) by deploying one or more algorithms for capturing elements of a screen, such as, e.g., algorithms for screen capture, window capture, desktop capture, sharing of documents, sharing of media, or any other suitable algorithms. In some embodiments, the system can display the screen element(s) via streaming or broadcasted video of the captured screen element(s) or any other suitable displaying technique. In some embodiments, the system captures the screen elements in segments, and displays the segments in real time as they are captured. In some embodiments, video and/or audio of the screen elements are captured. The capturing and displaying continue until there is no more of the screen elements to capture (for example, when the user has opted to stop sharing his or her screen or window).

At step 208, the system receives, from one or more additional participants, additional requests to initiate sharing of one or more additional screen elements from the user devices associated with the additional participants. In some embodiments, the additional requests may be received in a similar or identical fashion to the system receiving a request to initiate sharing in 204.

In some embodiments, requests from additional participants can be received at any time upon the request from the first request being received. In some cases, one or more participants can request to share their screen immediately after a first participant shares the screen, or at the same time as the first participant.

At step 210, in response to receiving the additional requests to initiate sharing of additional screen elements, the system captures and displays the additional screen elements from the user devices of the additional participants to the communication interfaces of the participants. In some embodiments, the system may capture and display the additional screen elements in a similar or identical fashion to the system capturing and displaying the screen element(s) in step 208.

In some embodiments, the concurrent display of multiple screen elements from multiple users requires one or more techniques or steps which function to enable the concurrency to be possible for each participant of the communication session and/or each user device associated with each participant. Such techniques or steps may include or involve, for example, video compression in order to reduce the required bandwidth of the video stream, techniques for low latency encoding, decoding, and display of screens with interactive elements, streaming techniques, reduction of frame rate or setting of a maximum frame rate, lowering video resolution, parallel processing, performing operations on video content frames and data, image data extraction and processing, or any other suitable technique or combination thereof.

In some embodiments, the system provides to one or more participants, via the communication interface for the participant, control over configuration of the screen element(s) as well as the additional screen elements. In some embodiments, this control may include, e.g., size or orientation of each screen element within the participant's configuration interface. In some embodiments, this control may include a selection of which screen elements to display and which to not display. In some embodiments, only a participant with certain permissions or privileges within the communication platform may be authorized to control certain configuration features with respect to the screen elements.

In some embodiments, a participant can configure the screens to be viewed adjacent to one another on a single screen of a user device for the participant. For example, if a given participant is only using a single monitor setup at their desk, the participant may opt to view two screen elements side by side within that single monitor's display. In some embodiments, the system first determines that at least one of the participants is using multiple displays connected to a user device (such as, e.g., a multi-monitor setup), and then configures separate screen elements to be viewed on the multiple screens, such that each screen element is viewable on a separate screen of the user device.

In some embodiments, the system can be configured to receive a request from a participant to remotely control a screen element of another participant; and based on the request, the system can provide the ability for the participant to remotely control the screen element of the other participant. In various embodiments, the system can deploy this remote control of the screen element via one or more remote control applications, algorithms or techniques, such as, e.g., remote desktop control, remote application control, remote window control, or any other suitable technique.

In some embodiments, where at least one of the participants is a host or administrator for the communication session, the host or administrator can be granted permission by the system to configure sharing privileges of screen elements for the other participants. In some embodiments, the host or administrator can access a permissions interface by navigating the communications interface and interacting with one or more interface elements. The permissions interface can allow the host or administrator to configure one or more permissions or privileges with respect to a communication session or sessions and/or one or more participants within the communication session. One example of a host or administrator having the ability to configure sharing privileges for the other participants is illustrated in FIG. 3B, as will be discussed in further detail below.

In some embodiments, where at least one of the participants is a host or administrator of the communication session, the host can be granted permission to configure which screen is viewed by all participants as a primary screen within the communication session. For example, the host can figure his or her own shared screen as a primary screen that is prominently displayed to participants, and one or more additional shared screens from additional participants as secondarily displayed, e.g., displayed next to the primary screen but less prominently. In some embodiments, different participants can view the screens and/or screen elements differently depending on the participant's user device and configuration (e.g., one monitor or multiple monitors).

In some embodiments, the session can be recorded and stored for later viewing, and at least the host is granted permission to configure which of the screen elements end up within the recording. The host may be able to configure such permissions within a communication interface, as described above. In some embodiments, upon playback of the recorded session, the user viewing the recording can switch between screen elements that are shared or configure how screen elements are viewed. Thus, in some embodiments, rather than the recording having a fixed view which cannot be altered, the recording can be dynamic in terms of the view(s) that a user can select when playing back the recording. In other embodiments, the recording can have a static, fixed view. In some embodiments, an administrator or host can configure the screen arrangement that appears within the static, fixed view.

In some embodiments, each participant has the ability to maximize, minimize, resize, and/or position each displayed screen element within the participant's communication interface. Each screen element can therefore be positioned as if it is a "window" UI element, to provide the participant with the ability to arrange the screen elements flexibility for optimum viewing and working space on the screen of the user device.

In various embodiments, the displayed screen elements can include one or more of an application, a whiteboard, a window, a desktop interface, a presentation, or any combination thereof. In some embodiments, any of these formats can be combined among multiple screens or screen elements. For example, multiple screens or screen elements shared from multiple different users may take the form of an application and a whiteboard; a window and an application; a desktop and an application; two different applications as well as a whiteboard, browser tab, and desktop; or any other combination. A variety of different formats and combinations can be contemplated.

In some embodiments, each participant is provided with the ability to provide annotations within screen elements displayed by the participant and/or other participants. The system receives annotation inputs corresponding to screen(s) and/or screen element(s) that are being displayed. In some embodiments, the annotation inputs may be provided via touch or stylus input from one or more client devices. For example, a user may use a stylus to sketch notes on the screen of a client device which is showing a presentation from a participant. As the participant sketches notes while displaying, the notes are received by the system. In some embodiments, annotation inputs may include, e.g., touch-based annotations, messaging-based annotations (including, e.g., emojis and other symbols), or media-based annotations (such as video, audio, documents, images, drawings, or any other suitable media).

In some embodiments, the participants are provided with the ability to switch the view on the client device to any one of the shared screen or screen elements from the participants. For example, a participant may be able to jump between four different screens or screen elements shared by multiple participants. In some embodiments, the participant may opt to view two, three, or all four screens or screen elements simultaneously. In some embodiments, where multiple displayed screens or screen elements include audio playback simultaneously, the participant may be able to select between them in order to only hear one audio signal at a time.

In some embodiments, there may be no limitation to the number of screen elements which can be displayed simultaneously, such that an arbitrary number of participants can concurrently display an arbitrary number of screen elements. For example, in a large conference session with 100 users participating, it may be possible for all 100 users to share their screens. Users can choose which screens to view, including multiple screens side-by-side or split in various configurations across multiple monitors.

FIG. 3A is a diagram illustrating a communications interface with screen sharing elements, in accordance with some embodiments.

In the illustrated example, the communication interface for a participant includes a number of UI elements along the bottom of the interface, such as elements for, e.g.: inviting a user to the session; managing participants; polling participants; sharing screen, chatting, recording, and coordinating breakout rooms for participants. A UI element 302 labeled "Share Screen" is provided for the user to share his screen(s) and/or one or more screen elements. Upon engaging with the UI element (e.g., clicking on the element), the UI may allow the user to select between various screen elements that the user has present, open, or accessible within their environment. In some embodiments, one or more of the screen elements may represent a full screen, such as a desktop UI of a computer device. In some embodiments, multiple such screens may be selected between, for example, when a participant is using a multiple monitor setup with a different desktop configured to be displayed on each monitor. In some embodiments, the user can select multiple screen elements to be shared. For example, a user with four window elements open on a desktop may opt to share two of the window elements simultaneously. In another example, a user with two desktop UIs (or "screens") displayed across two monitors may opt to share both of the screens.

Sharing options 304 are also displayed when the user interacts with the up arrow element to the right of the screen sharing UI element 302. The displayed sharing options include switching between one participant being able to share at a given time, and multiple participants being able to share simultaneously. In the illustrated example, the setting for only one participant being able to share at a time is enabled. An option is also present for the user to navigate to an "Advanced Sharing Options" window, as illustrated in FIG. 3B and described below.

FIG. 3B is a diagram illustrating a communications interface with screen sharing settings, in accordance with some embodiments. The example illustrated in FIG. 3B represents what the user viewing the communication interface of FIG. 3A would see if the user clicked on the "Advanced Sharing Options" menu option. A window titled "Advanced Sharing Options" is shown, with a series of option buttons a user can select between. In some embodiments, this window is only accessible for administrators or hosts of a communication session, and allows the administrator or host to configure permissions for sharing with respect to the other participants within the communication session. In some embodiments, the administrator or host is granted permission by the system (via, e.g., an account administrator) to configure sharing privileges of screen elements for the other participants. In some embodiments, the host or administrator can access a permissions interface by navigating the communications interface and interacting with one or more interface elements. In the illustrated example, the permissions interface takes the form of a window element with a series of option buttons to select between. In other embodiments, the permissions interface can take other forms.

A first sharing option presented reads, "How many participants can share at the same time?" and provides a choice between "one participant can share at a time" and "multiple participants can share simultaneously (dual monitors recommended)". This is similar or identical to the choice presented in the menu shown in FIG. 3A.

A second sharing option presented reads, "Who can share?" and provides a choice between "only host" and "all participants". Thus, the host or administrator can configure a particular communication session so that only he is able to share screen(s) or screen element(s), or can configure the session so that all participants are permitted to do so.

A third sharing option presented reads, "Who can start sharing when someone else is sharing?" and provides a choice between "only host" and "all participants". The host can thus configure the communication session so that only the host is able to start sharing after someone else initially shares screen(s) and/or screen element(s). Alternatively, the host can configure the communication session so that any participant of the session can start sharing after someone else initially shares screen(s) and/or screen element(s).

Many other such sharing options can be contemplated.

Figure 4A:
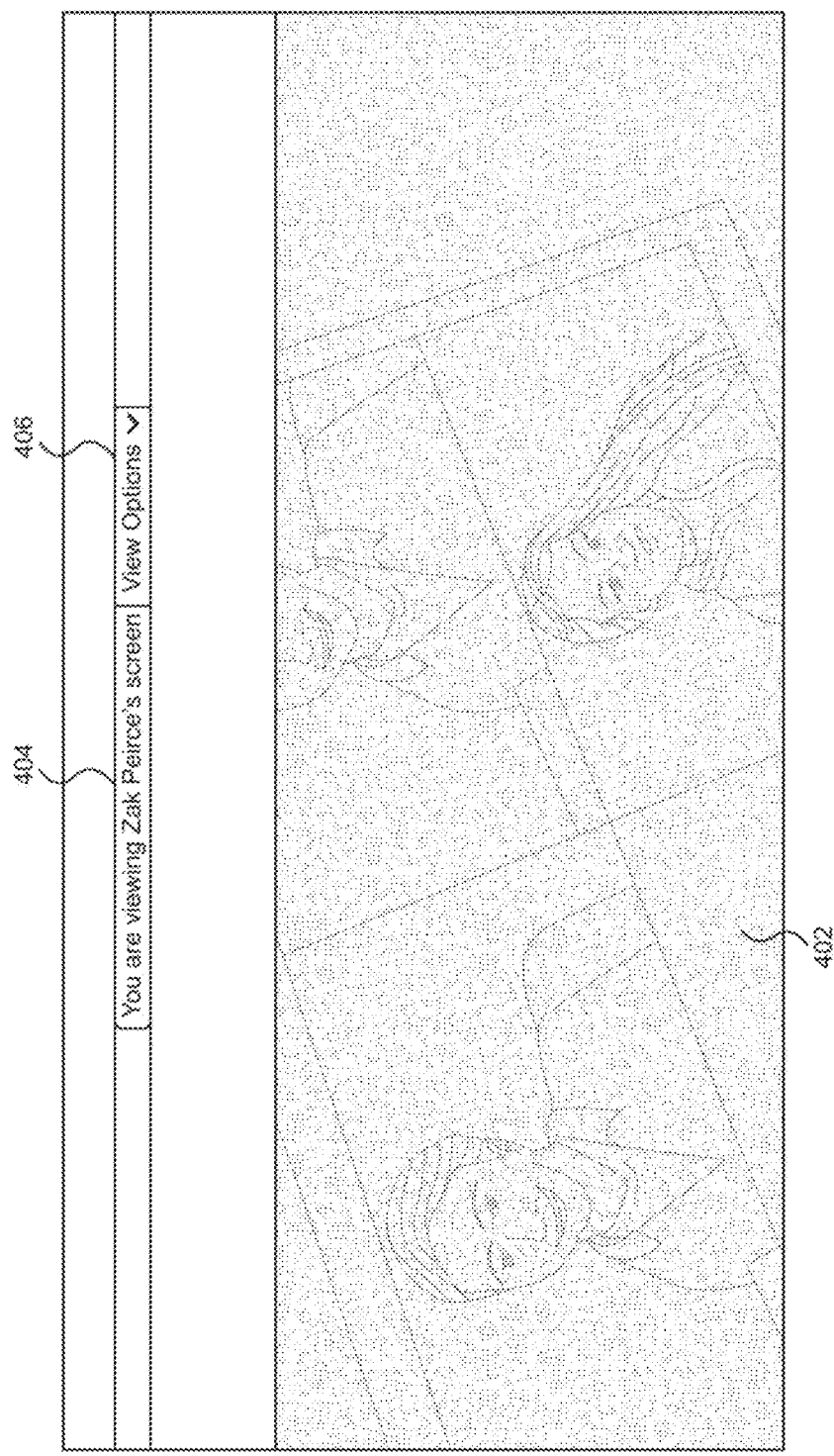
FIG. 4A is a diagram illustrating a communications interface with viewing options, in accordance with some embodiments.

FIG. 4A is a diagram illustrating a communications interface with viewing options, in accordance with some embodiments. The example illustrates a communication session which is currently active, with a communications interface for the session displayed on the screen of one of the participants' user devices. The communications interface shows a shared screen 402 from another participant. At the top of the communications interface, a message 404 reads "You are viewing Zak Pierce's screen". To the right of the message 404, a selectable drop down menu 406 can reveal a set of viewing options.

Figure 4B:
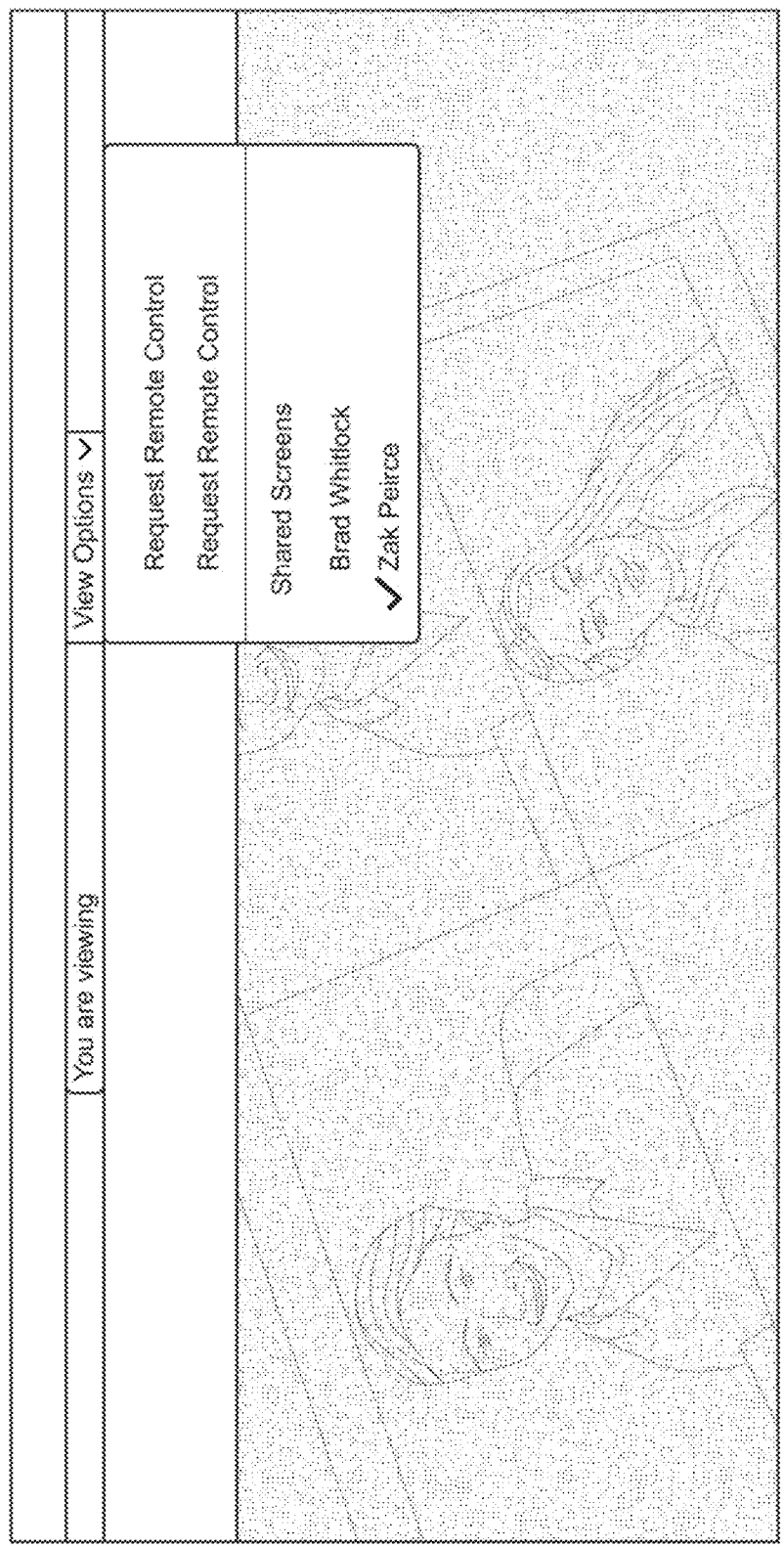
FIG. 4B is a diagram illustrating a communications interface with viewing options for multiple screens, in accordance with some embodiments.

FIG. 4B is a diagram illustrating a communications interface with viewing options for multiple screens, in accordance with some embodiments. If the user from FIG. 4A clicks on the selectable drop down menu 406 to reveal the viewing options, the drop down menu illustrated in FIG. 4B appears.

A first option, "request remote control" can be selected. In some embodiments, the system can be configured to receive a request from a participant to remotely control a screen element of another participant; and based on the request, the system can provide the ability for the participant to remotely control the screen element of the other participant. The option present allows the user to request remote control of another participant's screen or screen element.

A second option, "annotate" can also be selected. In some embodiments, each participant is provided with the ability to provide annotations within screen elements displayed by the participant and/or other participants. This can allow the participant to, for example, sketch or take notes directly on the screen or screen element shared by another participant, or shared by the annotating participant himself.

Third, a list of shared screens and/or screen elements is presented in the drop-down menu. The user is currently viewing Zak Peirce's shared screen, as designated by the checkmark next to the name. The option to also show Brad Whitlock's screen in addition to Zak Peirce's screen can be selected by clicking on Brad Whitlock's name. Checkmarks would then appear on both names, and both shared screens would be shown side-by-side.

Figure 4C:
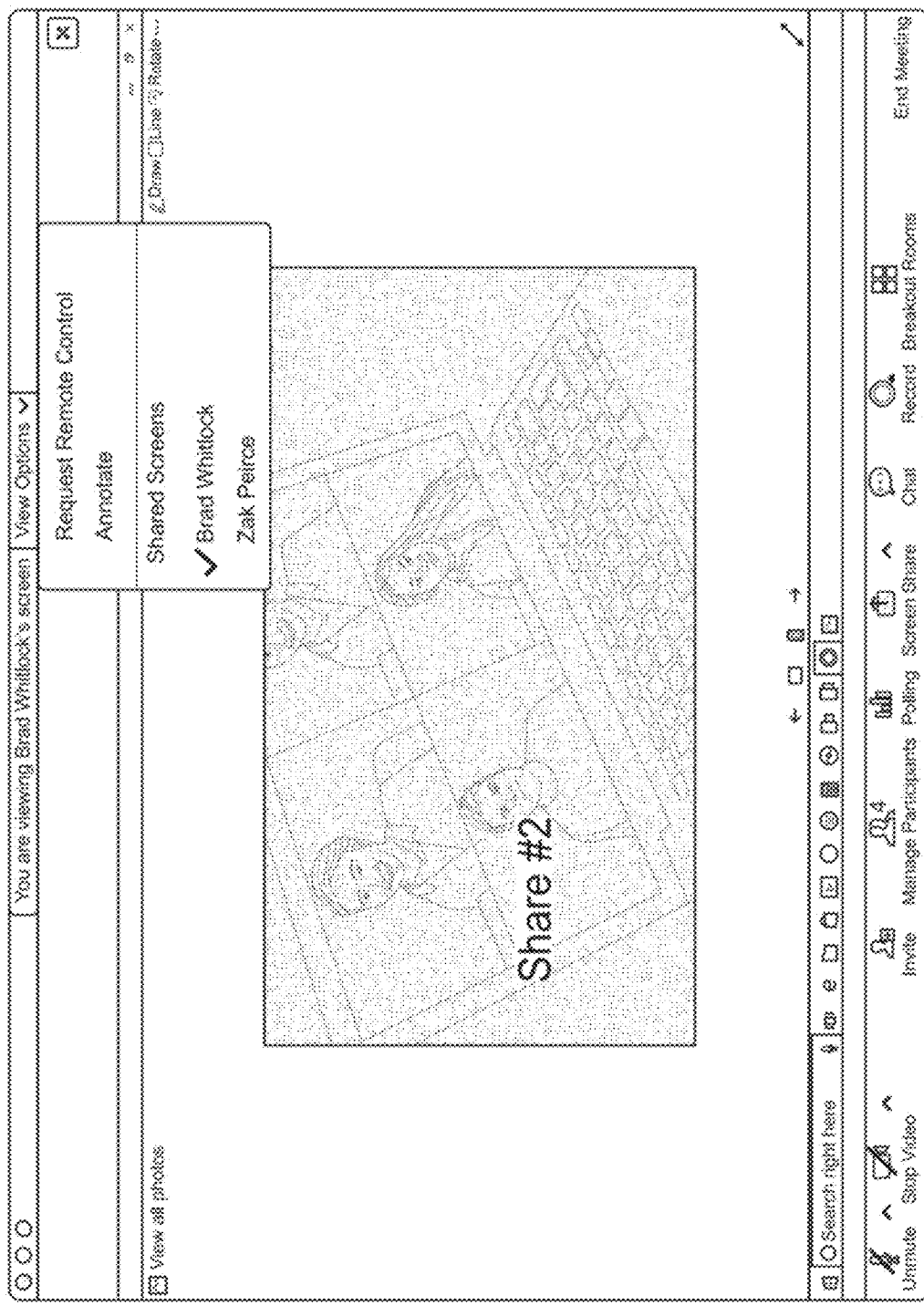
FIG. 4C is a diagram illustrating switching between multiple screens during a communication session, in accordance with some embodiments.

FIG. 4C is a diagram illustrating switching between multiple screens during a communication session, in accordance with some embodiments.

In the illustrated example, the user from FIG. 4B is viewing the "View Options" drop-down menu. The user wishes to switch from the currently displayed shared screen of Zak Peirce to the shared screen of Brad Whitlock. If the user wishes to switch from Zak Peirce's screen to Brad Whitlock's screen with only a single screen displayed, then the user would first click Zak Peirce's name to uncheck the name and disable viewing of his shared screen, then click Brad Whitlock's name to view Brad Whitlock's shared screen. As shown in the example, a different shared screen is now displayed, representing Brad Whitlock's shared screen.

Figure 5A:
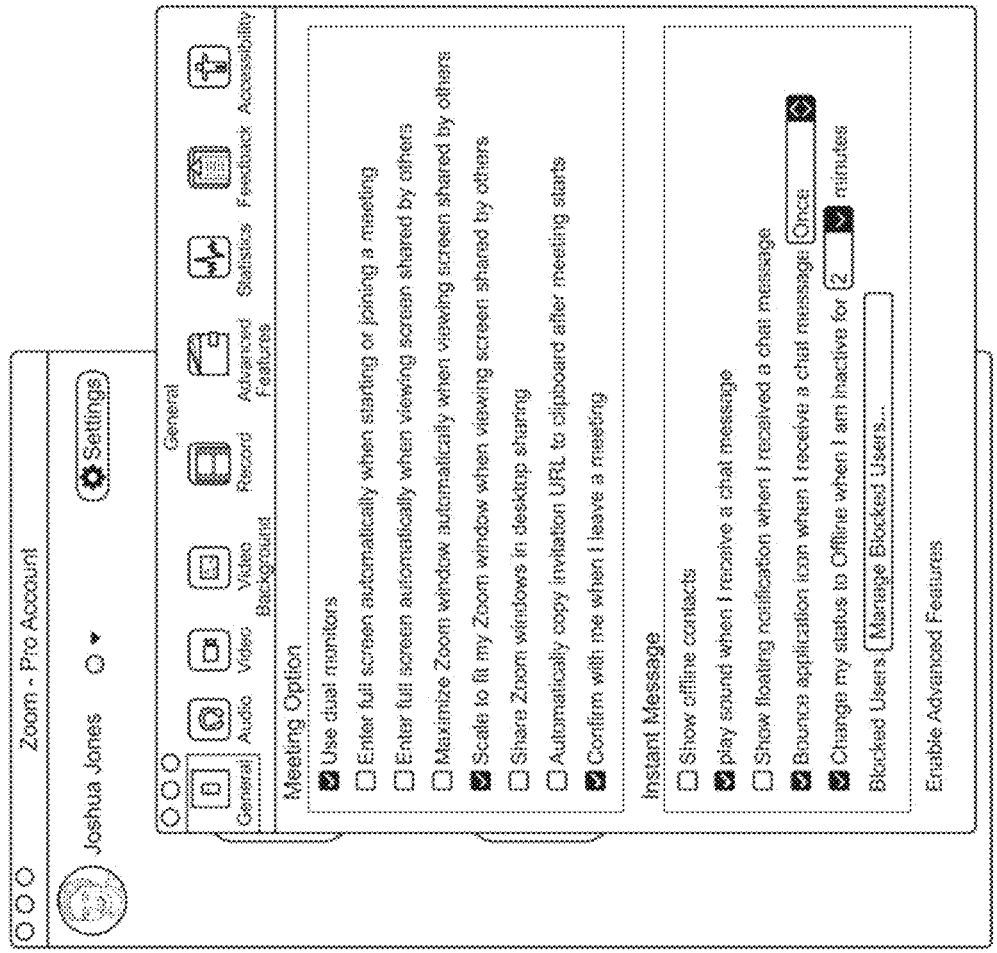
FIG. 5A is a diagram illustrating a communications interface with a dual monitor setting, in accordance with some embodiments.

FIG. 5A is a diagram illustrating a communications interface with a dual monitor setting, in accordance with some embodiments.

In some embodiments, participants of a communication session may navigate within the communications interface to a settings interface, where a number of settings can be viewed and selected. In the illustrated settings interface, a number of meeting options are displayed. The first option is "Use dual monitors", which is currently selected. If the user within the communication session is using a device with two monitors connected, then this option allows the user to view multiple shared screens from users simultaneously, with one screen displayed on each of the monitors. In some embodiments, this option is unavailable (such as, e.g., appearing as greyed out and non-interactive within the settings interface, or not appearing at all) if the system detects that only one monitor is connected to the user device. In some embodiments, rather than just two monitors, the option can allow for three monitors or more to display shared screens or screen elements.

Figure 5B:
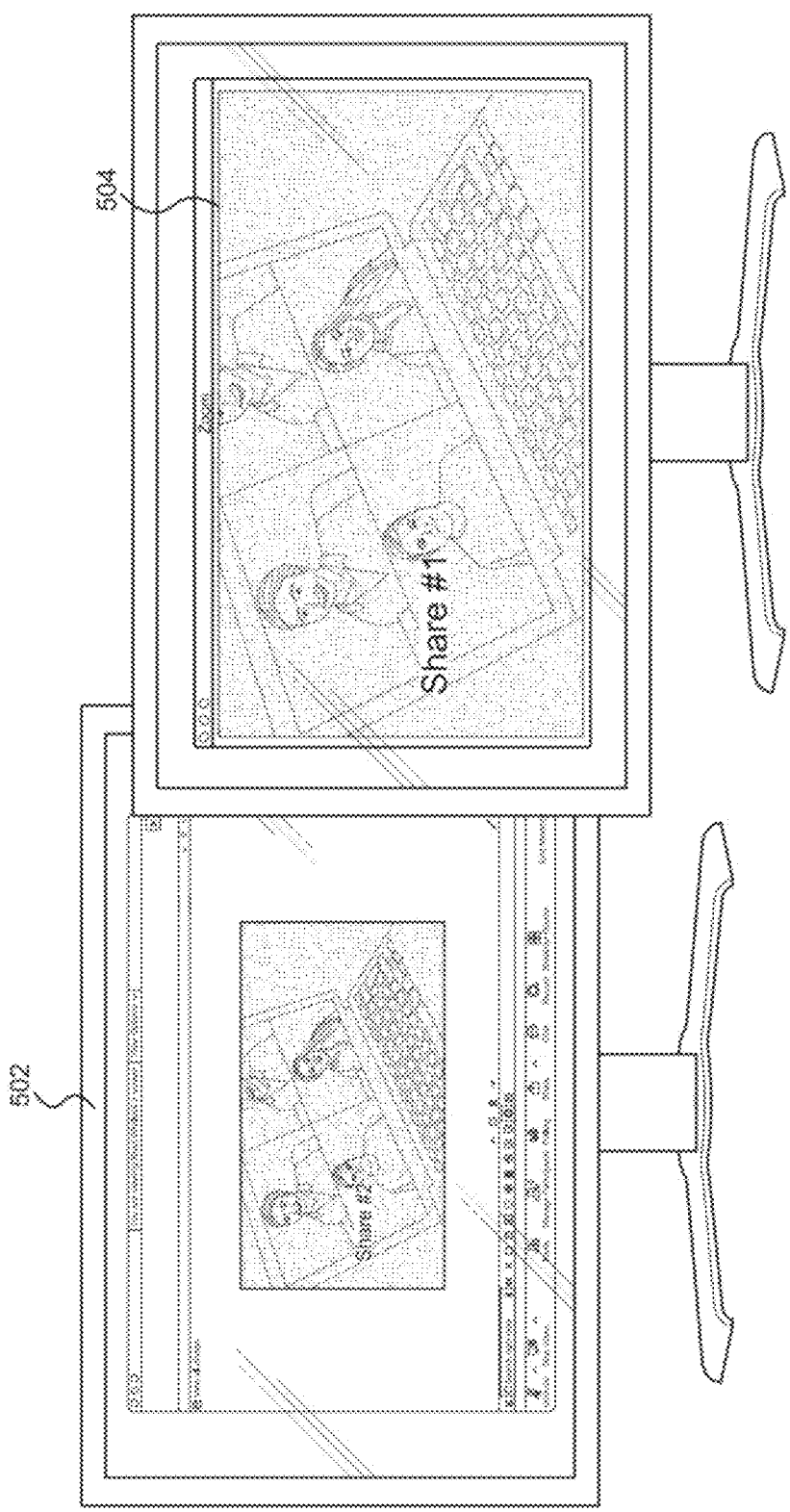
FIG. 5B is a diagram illustrating multiple screens viewed on multiple monitors, in accordance with some embodiments.

FIG. 5B is a diagram illustrating multiple screens viewed on multiple monitors, in accordance with some embodiments.

If the settings interface of FIG. 5A has the "Use dual monitors" option enabled, then a user with two monitors connected to his user device would be able to view multiple shared screens. For example, the user would be able to view two shared screens from participants, with one screen dedicated to each monitor. The illustrated example shows two monitors within a user's desk setup. The left monitor screen 502 displays the communication interface within the communication session, and within the communication interface, the second shared screen is shown (with "Share #2" displayed). The right monitor screen 504 displays the first shared screen in full screen view (with "Share #1" displayed). The user can thus view the communications interface, shared screen #1, and shared screen #2 side-by-side without needing to switch between multiple screens on a single monitor, or viewing both screens side-by-side in smaller windows on a single monitor.

Figure 5C:
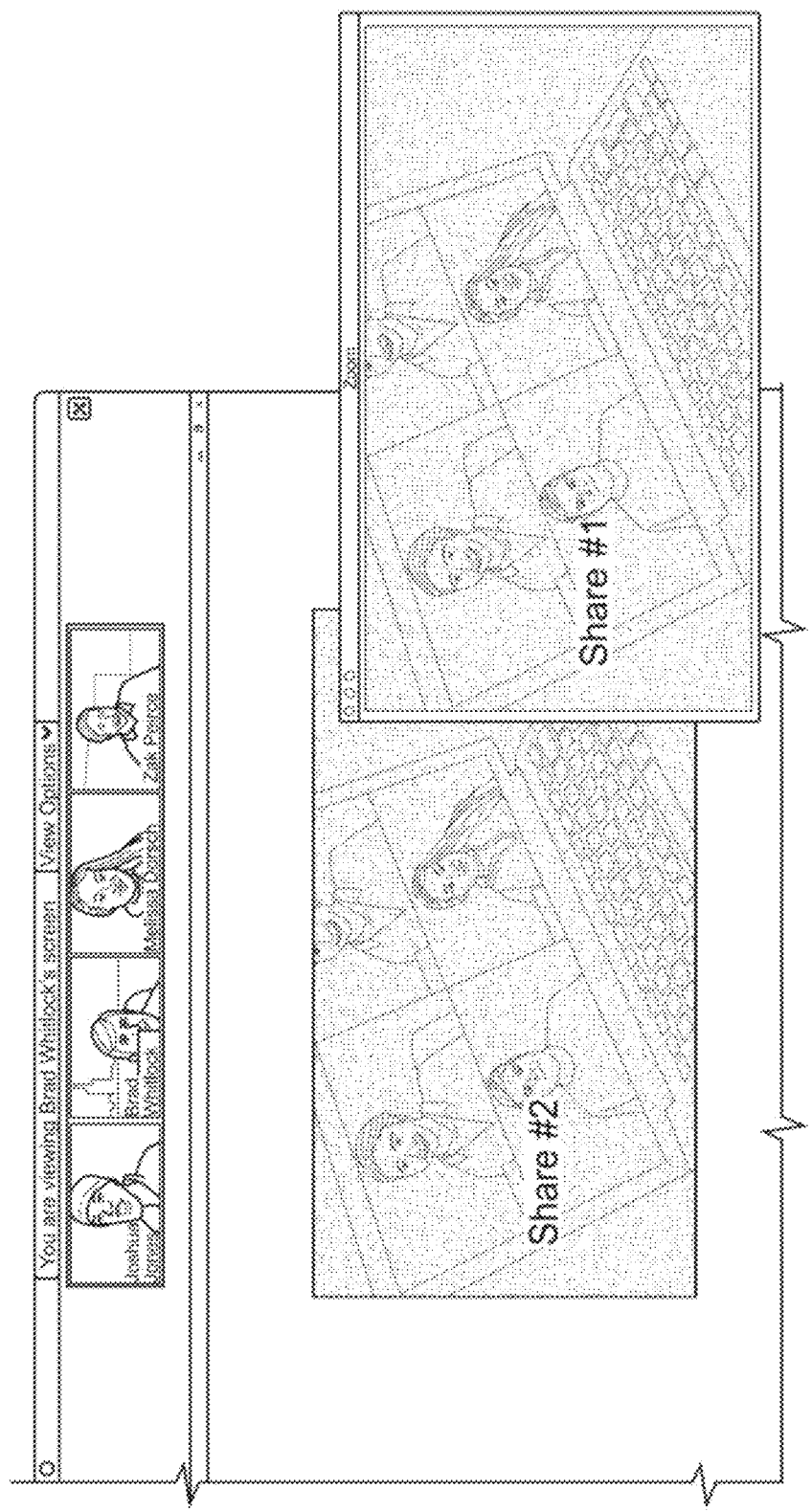
FIG. 5C is a diagram illustrating multiple screens viewed side-by-side on a single monitor, in accordance with some embodiments.

FIG. 5C is a diagram illustrating multiple screens viewed side-by-side on a single monitor, in accordance with some embodiments.

If the user only has a single monitor, rather than two or more monitors, than the user may still wish to view multiple screens side-by-side on the single monitor display. The illustrated example shows both shared screen #1 and shared screen #2 viewable within a single screen. The communications interface is also visible on the single screen, with a number of participants displaying video displayed. The communications interface and shared screen #2 are visible within a single window taking up the left ⅔rds of the screen, while shared screen #1 is visible within a second, smaller window on the right half of the screen. The user has the ability to maximize, minimize, resize, and/or position the displayed screens or screen elements in the windows, and arrange them such that one may overlap the other fully or partially. This provides flexibility in terms of how shared screens can be displayed. For example, the user may wish to enlarge a more important screen or a screen with smaller text, while decreasing the size of a less important screen or one that rarely needs to be consulted. Many other such configurations can be contemplated depending on the user's needs.

In some embodiments, more than two shared screens can be viewed simultaneously on a single monitor or single video session interface. For example, in some embodiments, three shared screens can be viewed side-by-side. In other embodiments, a 4×4 grid of shared screens may be viewable simultaneously. In yet other embodiments, a "gallery view" setting or other setting may enable a user to view a 5×5 grid of shared screens, or potentially a larger grid of shared screens. In some embodiments, an arbitrary number of shared screens may be viewable in any of a number of configurations.

Figure 5D:
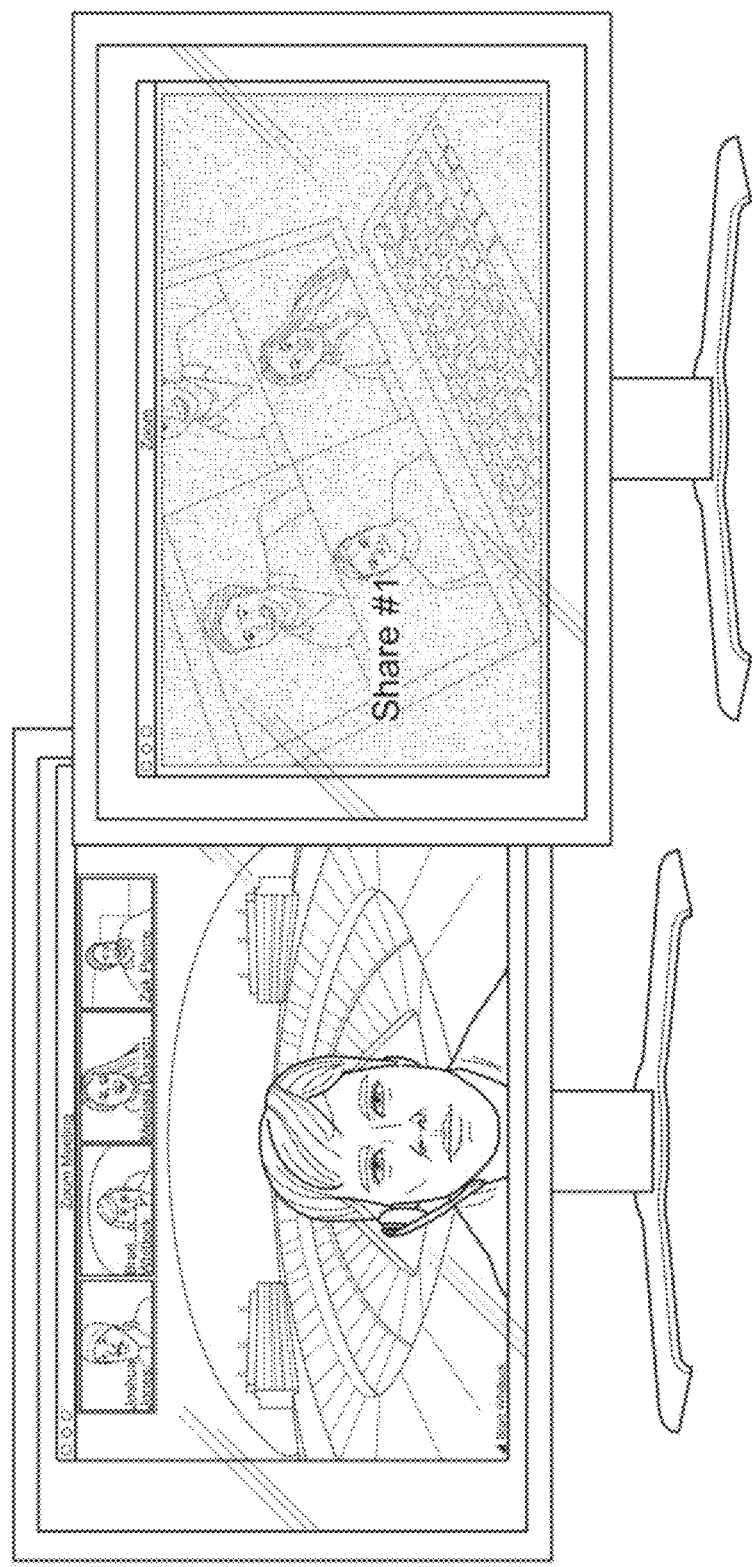
FIG. 5D is a diagram illustrating multiple screens viewed on multiple monitors, in accordance with some embodiments.

FIG. 5D is a diagram illustrating multiple screens viewed on multiple monitors, in accordance with some embodiments.

If the settings interface of FIG. 5A has the "Use dual monitors" option enabled, then a user with two monitors connected to his user device would be able to view multiple shared screens. In the illustrated embodiment, a first monitor shows a number of video feeds of participants. Four smaller, thumbnail-size video feeds are displayed at the top of the video session interface, while a large primary video feed is displayed in the remaining area of the video session interface. The large primary video feed pertain to a participant who is sharing content. On the second monitor, the shared screen associated with that participant from the primary video feed is displayed in the full area of the video session interface. In this setup, the user is able to view the shared screen's content in full view on one monitor, and the sharing participant's video in full view on the other monitor.

Figure 6:
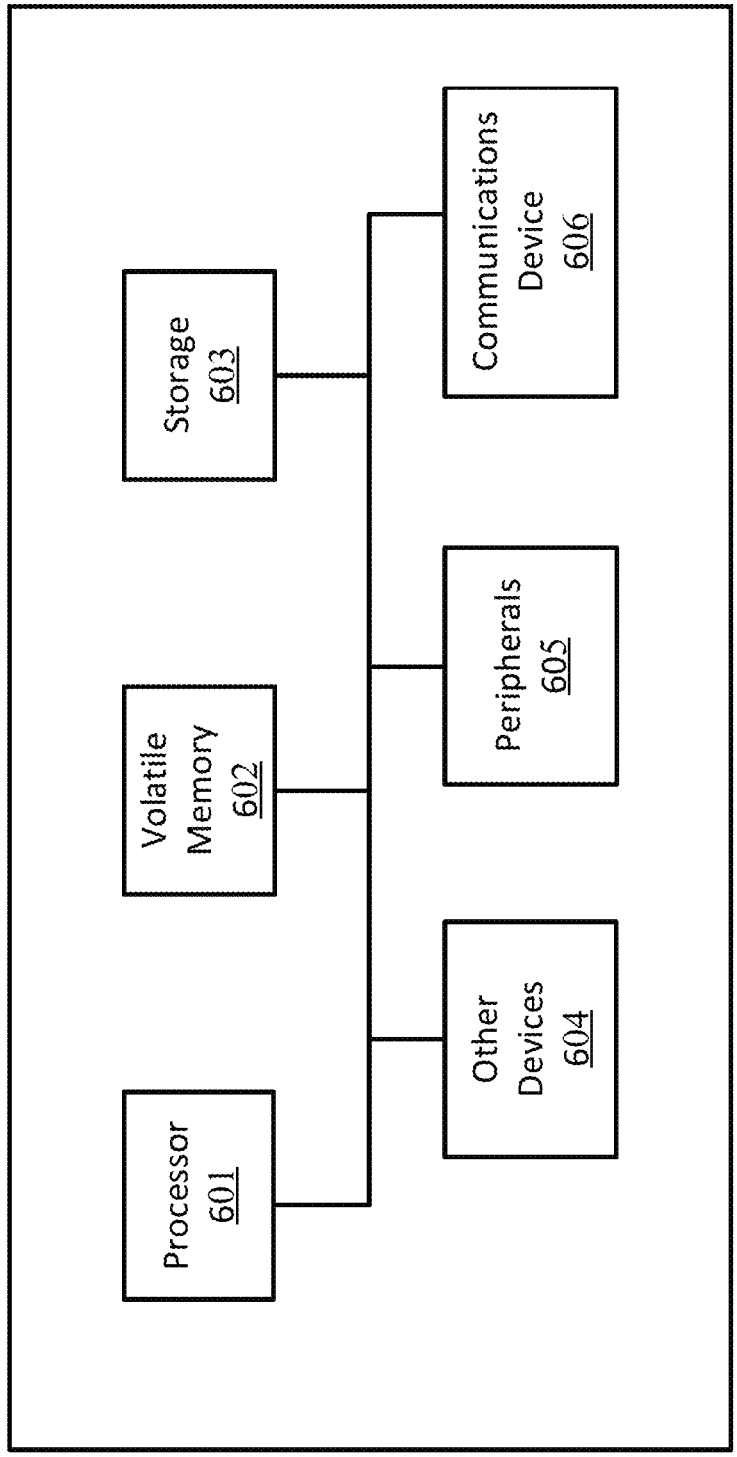
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing multiple participants of a communication session with the ability to share screen elements simultaneously, comprising:
  connecting a plurality of participants of a communication session to a live communication stream, wherein the communication session comprises a communication interface for each participant;
  receiving, from a first participant of the communication session, a request to initiate sharing of one or more screen elements from a user device associated with the first participant;
  in response to the request, capturing and displaying the one or more screen elements from the user device of the first participant to the communication interfaces of the plurality of participants;
  receiving, from one or more additional participants of the communication session, additional requests to initiate sharing of one or more additional screen elements from the user devices associated with the additional participants;
  in response to the additional requests, capturing and displaying the one or more additional screen elements from the user devices of the additional participants to the communication interfaces of the plurality of participants, such that a plurality of screen elements are displayed concurrently;
  providing one or more of the participants with control over configuration of the screen elements and the additional screen elements via the communication interfaces for the participants;
  determining that at least one of the participants is using multiple displays connected to a user device; and
  configuring separate screen elements to be viewed on the multiple screens, such that each screen element is viewable on a separate screen of the user device.

2. The method of claim 1, wherein the screens are configured to be viewed adjacent to one another on a single screen of a user device for the participant.

3. The method of claim 1, further comprising:
  receiving a request from a participant to remotely control a screen element of another participant; and
  based on the request, providing the ability for the participant to remotely control the screen element of the other participant.

4. The method of claim 1, wherein one of the participants is the host, and the host is granted permission to configure sharing privileges of screen elements for the other participants.

5. The method of claim 1, wherein at least one of the participants is a host of the communication session, and the host is granted permission to configure which screen is viewed by all participants as a primary screen within the communication session.

6. The method of claim 1, wherein the displayed screen elements comprise one or more of: an application, a whiteboard, a window, a desktop interface, a presentation, or any combination thereof.

7. The method of claim 1, wherein each participant is provided with the ability to provide annotations within screen elements displayed by the participant and/or other participants.

8. The method of claim 1, wherein the session is recorded and stored for later viewing, and at least the host is granted permission to configure which of the screen elements end up within the recording.

9. The method of claim 8, wherein upon playback of the recorded session, the user viewing the recording can switch between screen elements that are shared or configure how screen elements are viewed.

10. The method of claim 1, wherein each participant has the ability to maximize, minimize, resize, and/or position the displayed screen element as a window within the communication interface of the participant.

11. The method of claim 1, wherein there is no limitation to the number of screen elements which can be displayed simultaneously, such that an arbitrary number of participants can concurrently display an arbitrary number of screen elements.

12. A non-transitory computer-readable medium containing instructions for providing multiple participants of a communication session with the ability to share screen elements simultaneously, comprising:
  instructions for connecting a plurality of participants of a communication session to a live communication stream, wherein the communication session comprises a communication interface for each participant;
  instructions for receiving, from a first participant of the communication session, a request to initiate sharing of one or more screen elements from a user device associated with the first participant;
  in response to the request, instructions for capturing and displaying the one or more screen elements from the user device of the first participant to the communication interfaces of the plurality of participants;
  instructions for receiving, from one or more additional participants of the communication session, additional requests to initiate sharing of one or more additional screen elements from the user devices associated with the additional participants;
  in response to the additional requests, instructions for capturing and displaying the one or more additional screen elements from the user devices of the additional participants to the communication interfaces of the plurality of participants, such that a plurality of screen elements are displayed concurrently;
  instructions for providing one or more of the participants with control over configuration of the screen elements and the additional screen elements via the communication interfaces for the participants;
  instructions for determining that at least one of the participants is using multiple displays connected to a user device; and
  instructions for configuring separate screen elements to be viewed on the multiple screens, such that each screen element is viewable on a separate screen of the user device.

13. The non-transitory computer-readable medium of claim 12, further comprising:
  instructions to receive a request from a participant to remotely control a screen element of another participant; and
  based on the request, instructions to provide the ability for the participant to remotely control the screen element of the other participant.

14. The non-transitory computer-readable medium of claim 12, wherein at least one of the participants is a host of the communication session, and the host is granted permission to configure sharing privileges of screen elements for the other participants.

15. The non-transitory computer-readable medium of claim 12, wherein the displayed screen elements comprise one or more of: an application, a whiteboard, a window, a desktop interface, a presentation, or any combination thereof.

16. The non-transitory computer-readable medium of claim 12, wherein each participant is provided with the ability to provide annotations within screen elements displayed by the participant and/or other participants.

* * * * *